(12) United States Patent
Hareuveni et al.

(10) Patent No.: US 9,585,080 B2
(45) Date of Patent: Feb. 28, 2017

(54) TECHNIQUES FOR CONDUCTING FINE TIMING MEASUREMENTS

(71) Applicant: INTEL CORPORATION, Santa Clara, CA (US)

(72) Inventors: Ofer Hareuveni, Haifa (IL); Ehud Reshef, Kiryat Tivon (IL); Jonathan Segev, Tel Mond (IL); Elad Oren, Tel Aviv (IL)

(73) Assignee: INTEL CORPORATION, Santa Clara, CA (US)

( * ) Notice: Subject to any disclaimer, the term of this patent is extended or adjusted under 35 U.S.C. 154(b) by 83 days.

(21) Appl. No.: 14/582,092

(22) Filed: Dec. 23, 2014

(65) Prior Publication Data
US 2016/0183171 A1    Jun. 23, 2016

(51) Int. Cl.
| H04W 40/24 | (2009.01) |
| H04W 8/00 | (2009.01) |
| H04W 64/00 | (2009.01) |
| G01S 5/00 | (2006.01) |
| G01S 5/14 | (2006.01) |
| G01S 13/76 | (2006.01) |
| H04W 4/00 | (2009.01) |
| H04W 4/02 | (2009.01) |

(52) U.S. Cl.
CPC .............. H04W 40/246 (2013.01); G01S 5/00 (2013.01); G01S 5/14 (2013.01); G01S 13/765 (2013.01); G01S 13/767 (2013.01); H04W 4/001 (2013.01); H04W 8/005 (2013.01); H04W 64/00 (2013.01); H04W 4/02 (2013.01)

(58) Field of Classification Search
CPC .... H04W 40/24; H04W 40/246; H04W 8/005; H04W 28/0226; H04W 4/02; H04L 12/1845; H04L 29/08657; H04L 29/06482
See application file for complete search history.

(56) References Cited

U.S. PATENT DOCUMENTS

| 9,237,546 | B1* | 1/2016 | Zhang | H04W 64/00 |
| 2015/0139213 | A1* | 5/2015 | Abraham | H04L 69/28 370/338 |
| 2015/0341892 | A1* | 11/2015 | Aldana | H04W 64/00 455/456.2 |
| 2015/0350027 | A1* | 12/2015 | Raissinia | H04B 17/318 455/517 |
| 2015/0365835 | A1* | 12/2015 | Segev | H04W 8/005 370/252 |
| 2016/0014565 | A1* | 1/2016 | Segev | H04W 4/025 455/456.1 |
| 2016/0021495 | A1* | 1/2016 | Segev | H04W 64/00 455/456.3 |

* cited by examiner

Primary Examiner — Ashley Shivers

(57) ABSTRACT

Various embodiments are generally directed to an apparatus, method and other techniques to communicate configuration information during a neighbor aware network (NAN) discovery window to establish a fine timing measurement (FTM) procedure with one or more stations, the configuration information comprising at least one of a channel, a FTM start time, and an ordered list of the one or more stations, and perform the FTM procedure with the one or more other stations by communicating information in one or more FTM frames during a burst period.

22 Claims, 8 Drawing Sheets

600

COMMUNICATE CONFIGURATION INFORMATION DURING A NEIGHBOR AWARE NETWORK (NAN) DISCOVERY WINDOW TO ESTABLISH A FINE TIMING MEASUREMENT (FTM) PROCEDURE WITH ONE OR MORE STATIONS, THE CONFIGURATION INFORMATION COMPRISING AT LEAST ONE OF A CHANNEL, A FTM START TIME, AND AN ORDERED LIST OF THE ONE OR MORE STATIONS
_605_

PERFORM THE FTM PROCEDURE WITH THE ONE OR MORE OTHER STATIONS BY COMMUNICATING INFORMATION IN ONE OR MORE FTM FRAMES DURING A BURST PERIOD
_610_

600

COMMUNICATE CONFIGURATION INFORMATION DURING A NEIGHBOR AWARE NETWORK (NAN) DISCOVERY WINDOW TO ESTABLISH A FINE TIMING MEASUREMENT (FTM) PROCEDURE WITH ONE OR MORE STATIONS, THE CONFIGURATION INFORMATION COMPRISING AT LEAST ONE OF A CHANNEL, A FTM START TIME, AND AN ORDERED LIST OF THE ONE OR MORE STATIONS
*605*

PERFORM THE FTM PROCEDURE WITH THE ONE OR MORE OTHER STATIONS BY COMMUNICATING INFORMATION IN ONE OR MORE FTM FRAMES DURING A BURST PERIOD
*610*

*FIG. 6*

TECHNIQUES FOR CONDUCTING FINE TIMING MEASUREMENTS

TECHNICAL FIELD

Embodiments described herein generally relate techniques to perform fine timing measurements.

BACKGROUND

Advances in technology have resulted in smaller and more powerful computing devices. For example, there currently exist a variety of portable personal computing devices, including wireless computing devices, such as portable wireless telephones, personal digital assistants (PDAs), wearable computer devices, and paging devices that are small, lightweight, and easily carried by users. More specifically, portable wireless telephones, such as cellular telephones and internet protocol (IP) telephones, can communicate voice and data packets over wireless networks. Further, many such wireless telephones can include other types of devices that may be incorporated in the wireless telephones. For example, a wireless telephone can also include a digital still camera, a digital video camera, a digital audio recorder, and an audio file player. Also, such wireless telephones can process instructions, such as a web browser application that can be used to access the Internet. Memories, such as a memory within a wireless telephone or other electronic device, may store instructions in addition to other data.

As wireless devices become less expensive and more common, networks can experience increased traffic, potentially burdening the networks, slowing performance of the wireless devices, and frustrating users. Accordingly, network setup and network resource allocation (e.g., how traffic is routed within the network) can be relatively important considerations in designing and implementing wireless devices and wireless networks.

Global navigation satellite systems (GNSSs), such as the global positioning system (GPS) and other like satellite positioning systems have enabled navigation services for mobile handsets in outdoor environments. Likewise, particular techniques for obtaining estimates of positions of mobile device in indoor environments may enable enhanced location based services in particular indoor venues such as residential, governmental or commercial venues. For example, a range between a mobile device and a transceiver positioned at fixed location may be measured based, at least in part, on a measurement of a round trip time (RTT) measured between transmission of a first message from a first device to a second device and receipt of a second message at the first device transmitted in response to the request message.

BRIEF DESCRIPTION OF THE DRAWINGS

FIG. 6 illustrates an embodiment of a second logic flow diagram.

DETAILED DESCRIPTION

Figure 1:
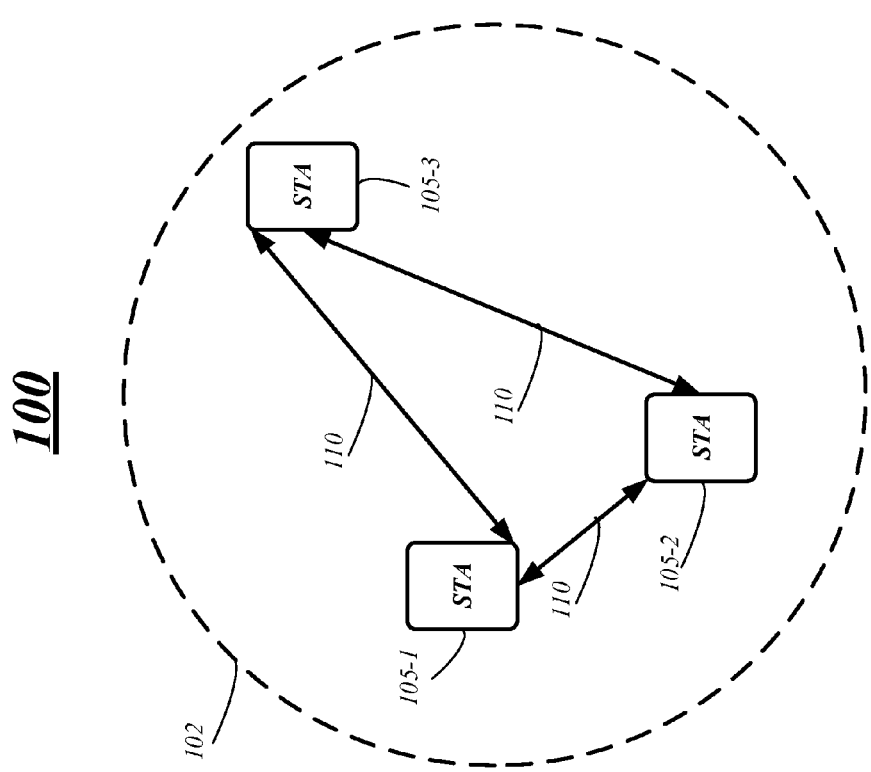
FIG. 1 illustrates an embodiment of a computing system.

Various embodiments are generally directed to an apparatus, system and method to configure and perform fine timing measurements (FTM) procedures. In some embodiment a FTM procedure may be used to determine a position location of a station, and a proximate location of a station with respect to other stations. An FTM procedure is generally used indoors such as in malls, hotels, offices, train stations, and so forth. In some embodiments, the FTM procedure may include using Round Trip Time (RTT) measurements and other methods using Time of Arrival (ToA) and Time of Departure (ToD) measurements. Moreover, Time of flight (ToF) methods to compute location include RTT measurements. These techniques determine location by measuring the RTT of signals between a station and another station.

The FTM procedures and measurements may occur in a wireless networking environment operating in accordance with one or more standards, such as the Institute of Electrical and Electronics Engineers (IEEE) 802.11-2012, published on Mar. 29, 2012 or according to any predecessors, revisions, or variants thereof including IEEE 802.11aq. Additionally, embodiments may operate in accordance with the Wi-Fi Alliance® Technical Task Group Wi-Fi Neighbor Awareness Networking (NAN) Wi-Fi NAN Technical Specification Version 0.0, revision 18, or according to any predecessors, revisions, or variants thereof. Various embodiments are not limited in this manner and it is contemplated that it may be used for other wireless technologies including, without limitation, LTE, 3GPP, Bluetooth®, Zigbee® and WiGig and in accordance with one or more other standards, such as IEEE 802.15 for wireless personal area network (PAN) standard, IEEE 802.22 wireless regional area network, and so forth.

In some embodiments, the FTM procedure may be configured by a station during a NAN discovery window. For example, a station may communicate configuration information including a channel to conduct the FTM procedure, a time to conduct the FTM procedure, and an order in which to conduct the FTM procedure. The configuration information may be communicated to other stations that are part of a NAN cluster in a frame, such as a multi-station fine timing measurement (msFTM) request/trigger frame or a NAN service discovery frame (SDF).

The stations involved in the FTM procedure may conduct the procedure in accordance with the configuration information. For example, the stations may communicate one or more FTM frames and fine timing measurement request (FTMR) frames during one or more burst periods to determine RTT, TOA, TOD, and TOF. The frames may be communicated on the channel indicated in the configuration information and at the time indicated in the configuration information. Furthermore, the stations may communicate in an order based on an ordered list in the configuration information. Various embodiments are not limited in this manner. Additional details will become more apparent in the following description.

Various embodiments also relate to an apparatus or systems for performing these operations. This apparatus may be specially constructed for the required purpose or it may include a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates an exemplary embodiment of a communication system 100 in which aspect of the present disclosure may be employed. The wireless communication system 100 may operate pursuant to any of the wireless standards previously discussed. The wireless communication system 100 may include a cluster 102 of WiFi stations (STAs) 105. The STAs 105 may communicate directly with each other via one or more communication links 110. As an example, a first STA 105-1 may communicate with a second STA 105-2. As another example, a first STA 105-1 may communicate with a third STA 105-3. As clearly illustrated in FIG. 1, any STA 105 may communicated with any other STA 105.

In various embodiments, a STA 105 may be embodied as a communication station, a mobile station, an advanced station, a client, a platform, a wireless communication device, an access point, a modem, a wireless modem, a Personal Computer (PC), a desktop computer, a mobile computer, a laptop computer, a notebook computer, a tablet computer, a server computer, a set-top box, a handheld computer, a handheld device, a Personal Digital Assistant (PDA) device, a handheld PDA device, and/or a netbook.

In embodiments, the STAs 105 can communicate in a wireless network in accordance with any of the standards previously discussed. Some embodiments may be used in conjunction with one or more types of wireless communication signals and/or systems, for example, Radio Frequency (RF), Infra Red (IR), Frequency-Division Multiplexing (FDM), Orthogonal FDM (OFDM), OFDMA, Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments may be used in various other apparatuses, devices, systems and/or networks.

In various embodiments, the STAs 105 in the communication system 100 may operate in accordance with the standards specification being developed by the Wi-Fi Alliance® related to Wi-Fi neighbor awareness networking (NAN) that enables device/service discovery based on Wi-Fi. In these embodiments, cluster 102 may be a NAN cluster that include devices or STAs 105 that share a common set of NAN parameters including time synchronization of discovery windows, time duration beacon intervals and time duration NAN channels. The STAs 105 may also be synchronized to the same discovery window schedule. As will be discussed in more detail, the STAs 105 may configure and establish a fine timing measurement (FTM) procedure during a discovery window on a NAN channel and conduct the FTM procedure on a non-NAN channel.

In some embodiments, when in a NAN cluster configuration, the STAs 105 may share a master role that transmits synchronization beacons and discovery beacons on a periodic, semi-periodic or non-periodic basis. However, some embodiments may include an infrastructure device that may take on the master role permanently or for an extended period of time. Once a STA 105 takes on the master role, it may transmit a synchronization beacon during a discovery window and a number of discovery beacons outside of the discovery window during the discovery window interval. A discovery window is defined by a time period and channel on which STAs 105 in the same NAN cluster converge and communicate information on and may be 16 millisecond (ms) in length, for example. In various embodiments, the device assuming the master role may communicate a synchronization beacon once every discovery window interval or at 512 ms increments during a discovery window. The device may also communicate a discovery beacon every 100 ms on average with a maximum interval time of 200 ms between discovery beacons outside of the discovery window.

In some embodiments, an initiating STA 105 may establish an FTM procedure among itself and other STAs 105 during a NAN discovery window on a NAN channel. For example, a NAN service discovery frame (SDF) may be communicated among the STAs 105 of the cluster 102 and includes configuration information to establish a FTM procedure. In some embodiments, the SDF frame may be a multi-station fine timing measurement (msFTM) request/trigger frame. In some embodiments, the SDF may be communicated as a multicast frame from one of the stations, such as STA 105-1, to one or more other stations, such as STA 105-2 and STA 105-3. However, various embodiments are not limited in this manner and in some embodiments the SDF may be communicated as a broadcast frame from one of the stations, such as STA 105-1, to a plurality of stations, such as STA 105-2 and STA 105-3. The SDF may be communicated among any of the stations in any manner.

The configuration information can include a channel to conduct the FTM procedure, a time to conduct the FTM procedure and an ordered list of target STAs 105 for the FTM procedure. In some embodiments, the channel to conduct the FTM procedure may be different than the channel the NAN discovery window occurs on. For example, the information sent during the NAN discovery window may be communicated on a NAN channel, while the FTM procedure may occur on a non-NAN channel. Various embodiments are not limited in this manner.

In various embodiments, the time included in the configuration information may be any time in the future when the FTM procedure is to occur. Moreover, the time may be an actual time or a time value to count up or down to. The time may be in any units include milliseconds, microsecond, nanoseconds, and so forth. Various embodiments are not limited in this manner.

The configuration information including the ordered list may be a list of STAs 105 in a particular order to conduct the FTM procedure. The ordered list may identify the STAs 105 by a media access control (MAC) address or some other device identification. Various embodiments are not limited in this manner and any combination of symbols and alpha-numerical characters may be used to identify a STA 105 in a list such that the device identification is unique for each STA 105. In addition, the order of the ordered list may be determined by the initiating STA 105 or the STA 105 establishing the FTM procedure. However, various embodiments are not limited in this manner and the order may be established by another station or device, such as an access point, an infrastructure device or network controlling device.

Figure 2:
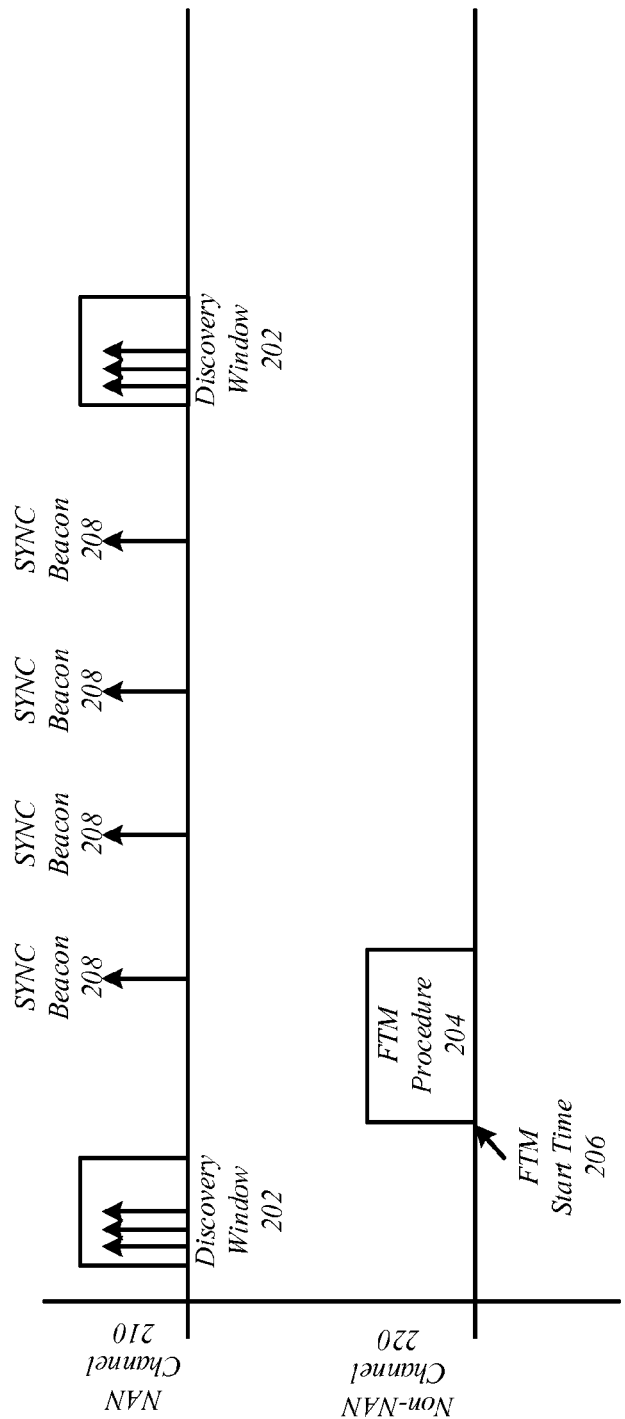
FIG. 2 illustrate embodiments of a communication diagram.

FIG. 2 illustrates an embodiment of a communication diagram 200 for establishing an FTM procedure. The communication diagram 200 indicates communications between one or more stations, such as STAs 105 of FIG. 1. However, various embodiments are not limited in this manner and communications in communication diagram 200 may occur between any number of stations or devices.

As illustrated in FIG. 2 any number of communications may be communicated between stations including one or more frames during a discovery window 202, and sync beacons 208 on a NAN channel 210. Generally, the sync beacons 208 may be used by other stations to synchronize on and to join a NAN cluster. Further, during a discovery window 202 one or more stations may advertise services through broadcast or multicast frames. Stations, such as STAs 105 in a NAN cluster 102, may listen to the broadcast or multicast frames to determine services available on the NAN channel 210, for example.

In some embodiments, one or more NAN beacons, SDFs and msFTM request/trigger frames may be communicated during a discovery window 202. As previously mentioned, an SDF or msFTM request/trigger frame may include configuration information for establishing a FTM procedure 204 on a non-NAN channel 220. For example, an SDF or msFTM request/trigger frame may include configuration information further including a channel, such non-NAN channel 220 to conduct the FTM procedure 204. The configuration information may also include a time, such as an FTM start time 206 to indicate when the FTM procedure 204 is to occur, and an ordered list to notify receiving stations establishing an order in which FTM exchanges are to occur during the FTM procedure 204. Thus, the stations receiving the SDF or msFTM request/trigger frame may switch to the non-NAN channel 220 at the FTM start time 206 to conduct an FTM procedure 204 in a defined order, for example. As will be discussed in more detail below in FIGS. 3A and 3B, one or more frames may be communicated between the stations during the FTM procedure 204 such that at least one of the stations may determine a location or a relative location based on timing information in the FTM frames.

Figure 3A:
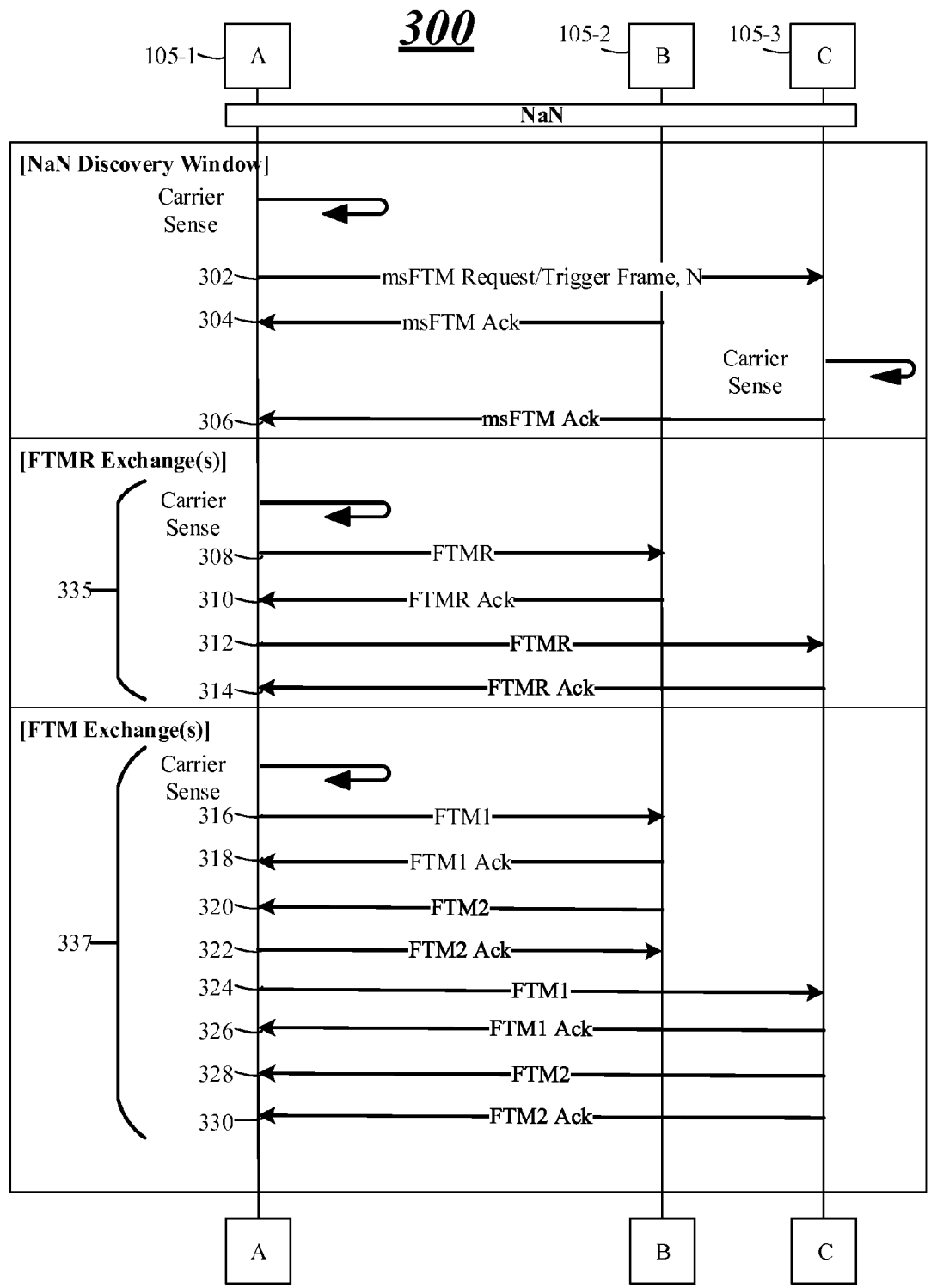
FIGS. 3A/3B illustrate embodiments of a sequence diagram.
Figure 3B:
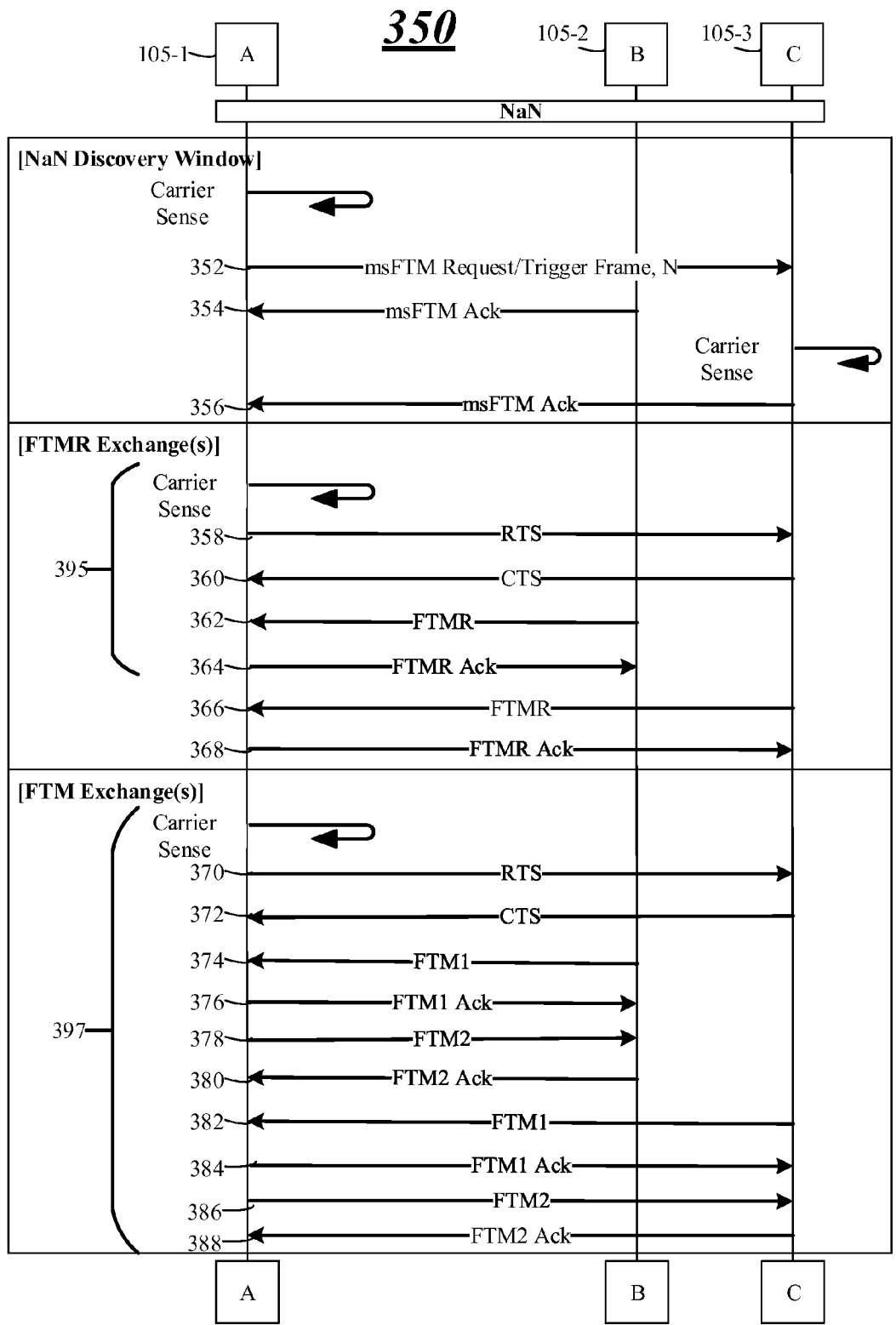

FIGS. 3A/3B illustrate embodiments of sequence diagrams 300 and 350 for establishing and conducting a FTM procedure. Moreover, FIGS. 3A and 3B illustrate an FTM procedure occurring between STAs 105-1, 105-2 and 105-3, labeled A, B and C, respectively. The STAs illustrated in FIGS. 3A and 3B may be the same as the STAs 105 discussed above with respect to FIG. 1. Although FIGS. 3A/3B illustrate certain frames being exchanged in a certain order, various embodiments are not limited in this manner. For example, one or more FTM exchanges may occur in a different and/or a different sequence of sending FTM frames and FTM acknowledgement frames, in some embodiments.

As previously discussed, a FTM procedure can be established between STAs 105 by communicating an SDF or msFTM request/trigger frame during a NAN discovery window having configuration information for the FTM procedure. The device sending or communicating the msFTM request/trigger frame may be an initiating station and stations responding to the msFTM request/trigger frame may be responder stations. However, various embodiments are not limited in this manner and in some embodiments, as illustrated in FIG. 3B, the station sending the msFTM request/trigger frame may act as a responder station.

At line 302, STA A 105-1 may send an msFTM request/trigger frame which may include configuration information, such as a channel, a time, and an ordered list, to both STA B 105-2 and STA C 105-3. Since STA A 105-1, STA B 105-2 and STA C 105-3 are in the same NAN cluster, they are assumed to be present and listening during NAN discovery window. Further and as previously discussed, the channel may be a non-NAN channel to conduct the FTM procedure, the time may be an FTM start time, and the ordered list may be the order in which STA B 105-2 and STA C 105-3 communicate FTM and FTMR frames.

At line 304, STA B 105-2 may communicate a response, such as an msFTM acknowledgement frame. Similarly, at line 306, STA C 105-3 may a response, such as an msFTM acknowledgement frame. The responses may indicate whether the STAs 105-2 and 105-3 will be present and will conduct the FTM procedure at the specified time.

In various embodiments, the STAs 105 may switch to the channel indicated in the configuration information, e.g. the non-NAN channel, at the specified time, e.g. FTM start time, to begin and conduct an FTM procedure which may occur during an FTM window. During an FTM procedure a number of frames may be communicated between the STAs 105 during one or more burst periods as one or more sequences. These communications may occur during burst periods to reduce the amount of time an FTM procedure may occur in. Moreover and by using burst periods, significant time savings may be realized during an FTM procedure freeing up bandwidth and the non-NAN channel for other communications.

At lines 308 through 314, FTMR exchanges may occur during a first burst period 335. In this illustrated embodiment, STA A 105-1 may be operating as an initiator station and STA B 105-2 and STA C 105-3 may be operating as responding stations. First, STA A 105-1 may conduct and FTMR exchange with STA B 105-2 as illustrated by lines 308 and 310 and then an FTMR exchange with STA C 105-3 as illustrated by lines 324 through 330. The ordering of these exchanges may have be previously established in the configuration information communicated in the NAN discovery window. Various embodiments are not limited to the illustrated embodiment and in some instances, STA C 105-3 may first conduct an FTMR frame exchange with STA A 105-1 and then STA B 105-2. In some embodiments, a burst period may be an interval or period of time in which an exchange of frames may occur, such as a media reservation interval or a transmit/receive duration which may be defined by a transmit/receive reservation.

At line 308, STA A 105-1 may communicate a FTMR frame with STA B 105-2. The FTMR frame may include a transmit/receive reservation, such as a network allocation vector (NAV) time, a media reservation, or any other type of transmission opportunity TXOP reservation for burst protection and to establish a burst period 335. The initiating station, STA A 105-1, may determine the length of the time for the transmit/receive reservation based on an expected exchange period to communicate FTMR and FTMR acknowledgements with one or more other stations. The FTMR frame may also be used by STA A 105-1 to confirm that STA B 105-2 is present on the channel to further conduct the FTM procedure. The STA B 105-2 may communicate an FTMR acknowledgement at line 310 confirming that the station is present on the channel to conduct FTM exchanges. Similarly, at line 312, the STA A 105-1 may communicate an FTMR frame with STA C 105-3 including the transmit/ receive reservation time for burst protection and to establish a burst period 335. At line 314, STA C 105-3 may communicate a response such as an FTMR acknowledgement message to STA A 105-1. The first burst period 335 may end and can be based on the expiration of the transmit/receive reservation time sent at lines 308 and 312 in the FTMR frames. By using the burst protection, other devices or stations may communicate on the channel after the expiration of the burst period 335.

At lines 316 through 330, FTM exchanges may occur during a second burst period 337. In this illustrated embodiment, STA A 105-1 may be operating as an initiator station and STA B 105-2 and STA C 105-3 may be operating as responding stations. First, STA A 105-1 may conduct and FTM exchange with STA B 105-2 as illustrated by lines 316 through 322 and then an FTM exchange with STA C 105-3 as illustrated by lines 324 through 330. The ordering of these exchanges may have be previously established in the configuration information communicated in the NAN discovery window. Various embodiments are not limited to the illustrated embodiment and in some instances, STA C 105-3 may first conduct an FTM frame exchange with STA A 105-1 and then with STA B 105-2.

At line 316, STA A 105-1 may communicate a FTM frame with STA B 105-2. The first FTM frame communicated with STA B 105-2 may include a transmit/receive reservation time for burst protection and to establish a burst period 337. The transmit/receive reservation time may be a period of time determined by STA A 105-1 such that it may communicate FTM exchanges with one or more other stations. The burst period 337 may be based on the transmit/receive reservation time and when the transmit/receive reservation time expires, the burst period 337 may end. As similarly discussed above, by using burst periods significant time savings may be realized with respect to channel occupancy times. In some embodiments, the STA A 105-1 may keep track of the time in which it sends the FTM frame at line 316 as time $t_1$.

At line 318, the STA A 105-1 may receive an FTM acknowledgement frame from STA B 105-2 at time $t_4$. The FTM acknowledgement frame may be used to acknowledge the receipt of the first FTM frame at line 316 by STA B 105-2. At line 320, STA B 105-2 may communicate an FTM frame which may include time information. For example, the time information may indicate a time when STA B 105-2 received the first FTM frame at line 316 as time $t_4$ and a time at which it communicated the first FTM acknowledgement at line 218 as time $t_3$. At line 322, the STA A 105-1 may communicate an FTM acknowledgement frame to STA B 105-2 to acknowledge the receipt of the FTM frame communicated at line 320.

In various embodiments, the STA A 105-1 may use the times, $t_1$, $t_2$, $t_3$ and $t_4$ to determine or calculate a round trip time (RTT) for communicating an FTM exchange with STA B 105-2. The RTT may be used by STA A 105-1 to establish a location or social proximity with STA B 105-2. In some embodiments, RTT may be calculated as shown in equation 1.

$$\text{RTT} = (t_4 - t_1) - (t_3 - t_2), \text{ where} \quad (1)$$

RTT=the round trip time,
$t_4$=the time at which a first FTM acknowledgement was received,
$t_1$=the time at which a first FTM frame was sent,
$t_3$=the time at the which the first FTM frame was received, and
$t_2$=the time at which the first FTM acknowledgement was sent.

In various embodiments, the initiating station, STA A 105-1 may repeat this FTM exchange with any number of stations. For example, the STA A 105-1 and STA C 105-3 may perform an FTM exchange as illustrated at lines 324 through 330. Based on timing information received during the FTM exchange between STA A 105-1 and STA C 105-3, the STA A 105-1 may determine an RTT and a proximity location with STA C 105-3. In some embodiments, the STA A 105-1 may perform a triangulation technique to determine its location relative to STA B 105-2 and STA C 105-3.

FIG. 3B illustrate another embodiment of one or more stations performing an FTM procedure. In sequence diagram 350, the initiating station, STA A 105-1 may operate as an FTM responder station and, STA B 105-2 and STA C 105-3 may be determine a location and/or a proximity location with STA A 105-1. As similarly discussed above with respect to FIG. 3A, lines 352 through 356 may be used to configure an FTM procedure between stations. For example, at line 352, STA A 105-1 may send an msFTM request/trigger frame which may include configuration information, such as a channel, a time, and an ordered list, to both STA B 105-2 and STA C 105-3. However, the msFTM request/trigger frame may include information indicating STA A's 105-1 desire to operate as a responder during the FTM procedure. At lines 354, STA B 105-2 may communicate a response, such as an msFTM acknowledgement frame. Similarly, at line 356, STA C 105-3 may send a response, such as an msFTM acknowledgement frame. The responses may indicate whether the STAs 105-2 and 105-3 will be present and will conduct the FTM procedure at the specified time.

At lines 358 through 368, an FTMR exchange may occur during a first burst period 395. In this illustrated embodiment, STA A 105-1 may be operating as a responder station and STA B 105-2 and STA C 105-3 may determine location and proximate location. First, STA A 105-1 may conduct and FTMR frame exchange with STA B 105-2 as illustrated by lines 358 through 364 and then an FTMR frame exchange with STA C 105-3 as illustrated by lines 366 and 368. The ordering of these exchanges may have be previously established in the configuration information communicated in the NAN discovery window. Various embodiments are not limited to the illustrated embodiment and in some instances, STA C 105-3 may first conduct an FTM frame exchange with STA A 105-1.

At line 358, the stations, STA A 105-1, STA B 105-2 and STA C 105-3 may initiate an FTMR exchange at the time and on the channel indicated in the configuration information. More specifically and at line 358, the STA A 105-1 may communicate a request-to-send (RTS) frame to stations STA B 105-2 and STA C 105-3. The RTS frame may include a transmit/receive reservation time for burst protect and to establish a first burst period 395 for the FTMR exchange. In response to the RTS frame, both or only one of the receiving stations, such as STA C 105-3 may communicate a clear-to-send (CTS) frame indicating that the channel is clear to further conduct communications.

In some embodiments, STA A 105-1 may receive an FTMR frame with a transmit/receive reservation time for burst protection from STA B 105-2 at line 362. The transmit/receive reservation time communicated in the FTMR frame may be the same transmit/receive reservation time value or a new transmit/receive reservation time determined by STA B 105-2. The new transmit/receive reservation time may be an expected amount of time for STA B 105-2 and STA C 105-3 to communicate an FTMR exchange with STA A 105-1. At line 364, STA A 105-1 may communicate a response, such as a FTMR acknowledgement to STA B 105-2. Similarly, at line 366, STA A 105-1 may receive an FTMR frame from STA C 105-3 and STA A 105-1 may communicate response, such as a FTMR acknowledgment to STA C 105-3 at line 368. At the end of the FTMR exchanges between STA A 105-1, STA B 105-2, and STA C 105-3, the first burst period 395 may expire and other stations may be free to communicate on the channel.

At lines 370 through 388, FTM exchanges may occur during a second burst period 397. In this illustrated embodiment, STA A 105-1 may be operating as a responder station. First, STA A 105-1 may conduct and FTM frame exchange with STA B 105-2 as illustrated by lines 370 through 380 and then an FTM frame exchange with STA C 105-3 as illustrated by lines 382 through 388. The ordering of these exchanges may have be previously established in the configuration information communicated in the NAN discovery window. Various embodiments are not limited to the illustrated embodiment and in some instances, STA C 105-3 may first conduct an FTM frame exchange with STA A 105-1.

An FTM exchange may be initiated by STA A 105-1 during a second burst period 397 at line 370. Further, STA A 105-1 may communicate an RTS with a transmit/receive reservation time for burst protection at line 370 since it is operating as a responding station. The transmit/receive reservation time may a time value based on STA A's 105-1 predicted FTM exchange time. At line 372, the STA A 105-1 may receive one or more CTS frames indicating to STA A 105-1 and other stations that is clear-to-send or communicate information on the channel.

At line 374, STA A 105-1 may receive an FTM frame which may also have a transmit/receive reservation time for burst protection. The FTM frame may be received from another station, such as STA B 105-2 based on an established ordered. In response and at line 376, STA A 105-1 may send an FTM acknowledgement frame to STA B 105-2 to acknowledge receipt of the FTM frame received at line 374. In addition, STA A 105-1 may send an FTM frame including timing information at line 378. The time information may include time value for when the STA A 105-1 received the FTM frame at line 374 and a second time value indicating when STA A 105-1 sent the FTM acknowledgement at line 376. STA B 105-2 may use these values to determine an RTT as similarly discussed above with respect to FIG. 3A and equation 1. Except in this example, STA A 105-1 is operating as the responding device and providing the timing information. This exchange may be repeated any number of times with any number of other stations. For example, lines 382 through 388 illustrate a similar exchange between STA A 105-1 and STA C 105-3 where STA A 105-1 is operating as the responding station. At the end of the FTM exchange, the burst period 397 may expire and other stations may be free to communicate on the channel.

Figure 4:
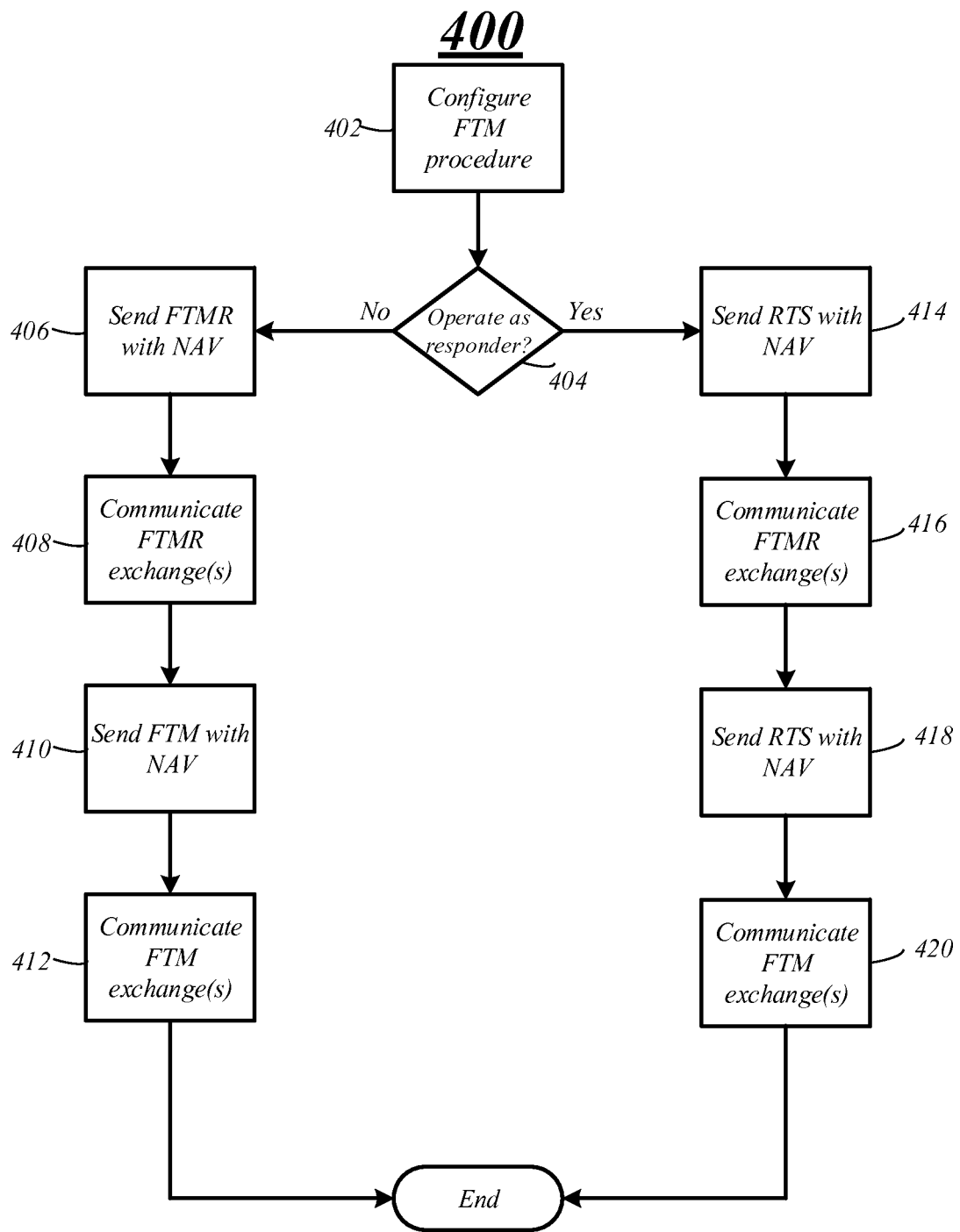
FIG. 4 illustrates an embodiment of a logic flow.

FIG. 4 illustrates an embodiment of a logic flow diagram 400. The logic flow 400 may be representative of some or all of the operations executed by one or more embodiments described herein. For example, the logic flow 400 may illustrate operations performed by one or more of the stations 105 in FIGS. 1 through 3B and station 505 in FIG. 5. Various embodiments are not limited in this manner.

At block 402, a FTM procedure may be configured by one or more stations, such as an initiating station. The FTM procedure can be configured by communicating configuration information during a NAN discovery window to one or more other stations in a NAN cluster. The configuration information may include a channel to conduct the FTM procedure, a time to start the FTM procedure, and an ordered list of other stations to conduct the FTM procedure. Various embodiments are not limited in this manner and the initiating station may communicate whether it desires to operate as a responder or not during the FTM exchange. In addition, the configuration information may be communicated during the NAN discovery window in any type of frame, such as an msFTM frame or a SDF frame.

At block 404, a determination may be made as whether the initiating station is operating as a responder station or not. If the initiating station is operating as a responder station, the initiating station may communicate an RTS with a transmit/receive reservation time to setup a first burst period to conduct one or more FTMR exchanges at block 414. The transmit/receive reservation time value may be any time value used by the receiving stations as a countdown time value. Any station not part of the FTM procedure may use the transmit/receive reservation time as an indication to not communicate information on the channel until the transmit/receive reservation time expires. The transmit/receive reservation time value may be an estimated amount of time in which the FTMR exchanges are predicted to occur.

At block 416, one or more FTMR exchanges may occur in which one or more FTMR frames and FTMR acknowledgement frames are communicated during the first burst period. A single FTMR exchange may be the exchange of a FTMR frame and FTMR acknowledgement frame with another station, for example. Moreover, the FTMR exchanges may occur on a channel and at a time based on the configuration information. The FTMR exchanges may occur in a particular order with stations based on the configuration information. Various embodiments are not limited in this manner. At the end of the FTMR exchanges, the first burst period may expire and other stations may be free to communicate on the channel.

In some embodiments, the initiating station may communicate an RTS frame with a transmit/receive reservation value to configure a second burst period to conduct one or more FTM exchanges at block 418. The transmit/receive reservation value may be an estimated amount of time determined by the initiating station in which the FTM exchanges are to occur. Moreover, the transmit/receive reservation value may be used by receiving stations, not conducting the FTM exchanges, to not communicate information. The RTS frame may be communicated on the same channel used in blocks 414 and 416 and determined by the configuration information.

At block 420, one or more FTM exchanges may occur. During an FTM exchange, an FTM frame and FTM acknowledgement frame may be communicated between two stations. An FTM frame may include one or more time values that may be used by the receiving station to determine a proximate location based on RTT. Further, the FTM acknowledgement frame may include information acknowledging the receipt of the FTM frame. Any number of FTM exchanges may occurring between stations and various embodiments are not limited in this manner. Further, the second burst period may end at the completion of the FTM exchanges between stations. Other stations may then be free to communicate on the channel.

In blocks 414 through 420, the initiating station may be operating as a responder stations. In other words, the initiating station may be exchanging one or more frames such that the other stations may be able to determine a location or proximate location to the initiating station. On the other hand, if the initiating station is not to operate as a responder station, as determined at block 404, the initiating station may determine its location and proximate location to other stations based on information communicated in the exchanges.

For example and at block 406, the initiating station may send an FTMR frame with a transmit/receive reservation time value to secure a first burst period to conduct FTMR exchanges. The FTMR frame may be communicated by the initiating station to other stations at a specified time on a specified channel based on the configuration information. Further, the initiating station may communicate one or more FTMR exchanges at block 408. An FTMR exchange may include communicating an FTMR frame and receiving a FTMR acknowledgement. The FTMR exchange may be communicated with any number of stations and based on an ordered in the configuration information. At the end of the FTMR exchanges, the first burst period may expire and other stations may be free to communicate on the channel.

At block 410, an initiating station may communicate an FTM frame with a transmit/receive reservation time value to establish a second burst period to conduct one or more FTM exchanges. An FTM exchange may include communicating an FTM frame and an FTM acknowledgement frame. In addition, the FTM exchanges may be used by the initiating station to determine a location or proximate location to other stations. For example, an FTM frame may have one or more time values which may be used to determine RTT and a proximate location to another station. Various embodiments are not limited in this manner.

Figure 5:
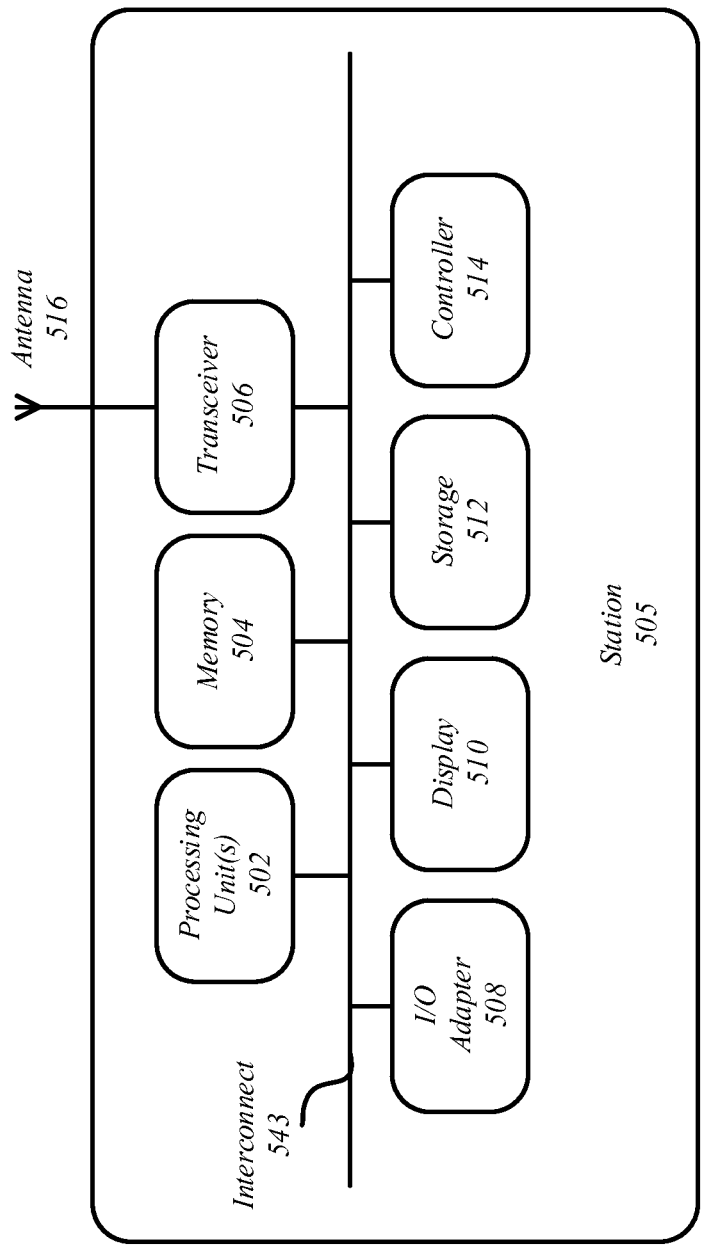
FIG. 5 illustrates an embodiment of a station.

FIG. 5 illustrates an embodiment of a station 505. In various embodiments, station 505 may be representative of a computing device or system for use with one or more embodiments described herein, such stations 105 of FIGS. 1-3B, and logic flow 400 of FIG. 4.

In various embodiments, station 505 may be any type of computing device including a computing device including a personal computer (PC), laptop computer, ultra-laptop computer, netbook computer, ultrabook computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a station 505 also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a station 505 may be implemented as a smart phone capable of executing computer applications, as well as voice communications and/or data communications. Although some embodiments may be described with a station 505 implemented as a smart phone by way of example, it may be appreciated that other embodiments may be implemented using other wireless mobile computing devices as well. The embodiments are not limited in this context. In some embodiments, station 505 may also be a vehicle navigation system, vehicle infotainment system, embedded in home appliances, etc.

As shown in FIG. 5, station 505 may include multiple elements. One or more elements may be implemented using one or more circuits, components, registers, processors, software subroutine modules, or any combination thereof, as desired for a given set of design or performance constraints. Although FIG. 5 shows a limited number of elements in a certain topology by way of example, it can be appreciated that more or less elements in any suitable topology may be used in station 505 as desired for a given implementation. The embodiments are not limited in this context.

In various embodiments, station 505 may include one or more processing unit(s) 502. Processing unit(s) 502 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit or processing circuitry. The processing unit(s) 502 may be connected to and communicate with the other elements and components of the computing system via an interconnect 543, such as one or more buses, control lines, and data lines.

In one embodiment, station 505 may include memory 504 to couple to processing unit(s) 502. In various embodiments, the memory 504 may store data and information for use by the station 505.

Memory 504 may be coupled to processing unit(s) 502 via interconnect 543, or by a dedicated communications bus between processing unit(s) 502 and memory 504, as desired for a given implementation. Memory 504 may be implemented using any machine-readable or computer-readable media capable of storing data, including both volatile and non-volatile memory. In some embodiments, the machine-readable or computer-readable medium may include a non-transitory medium. The embodiments are not limited in this context.

The memory 504 can store instructions and data momentarily, temporarily, or permanently. The memory 504 may also store temporary variables or other intermediate information while the processing unit(s) 502 is executing instructions. The memory 504 is not limited to storing the above discussed data and may store any type of data.

The station 505 may include a transceiver 506 which includes one or more components and circuitry to transmit and receive information using radio-frequency signals. More specifically, the transceiver 506 may include circuitry to produce radio-frequency mobile radio signals which are to be sent and for processing radio-frequency mobile radio signals which have been received. To this end, the transceiver 506 may be coupled to one or more antenna 516. The transmitted or received mobile radio signals are in one or more particular frequency ranges, which are typically prescribed by the mobile radio standard(s) supported by the radio-frequency assemblies. For example, transceiver 506 may include circuitry to process information according to one or more IEEE standards, one or more peer-to-peer protocols, and so forth. Various embodiments are not limited in this manner and transceiver 506 may transmit or receive information via any standard in any frequency range with one more devices, as previously mentioned.

In various embodiments, the transceiver 506 may be used to communicate with one or more other devices or stations. The transceiver 506 may send and receive information from the stations as one or more packets, frames, and any other transmission structure in accordance with one or more protocols.

The station 505 may include input/output adapter 508. Examples of I/O adapter 508 may include Universal Serial Bus (USB) ports/adapters, IEEE 1394 Firewire ports/adapters, and so forth. The embodiments are not limited in this context.

For example, an I/O adapter 508 may also include an input device or sensor, such as one or more buttons, a keyboard, a keypad, a touchscreen display, a touch sensitive device, a microphone, a biometric finger printer reader, biometric eye scanner or any other device used for inputting information into station 505. Moreover, the I/O adapter 508 may be a sensor including any hardware or logic to detect one or more touches or inputs on or near a housing of the apparatus, a display of the apparatus including a touchscreen or touch sensitive display.

In various embodiments, the I/O adapter 508 may include one or more components to output information to a user. For example, the I/O adapter 508 may include a speaker to output an audible noise or a haptic feedback device to output a vibration. The I/O adapter 508 may be located any within or on station 505, or may be separate and connected to the station 505 via a wired or wireless connection.

The station 505 may also include a display 510. Display 510 may constitute any display device capable of displaying information received from processor units 502, such as liquid crystal display (LCD), cathode ray tube (CRT) display, a projector, and so forth. Various embodiments are not limited in this manner.

The station 505 may also include storage 512. Storage 512 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 512 may include technology to increase the storage performance enhanced protection for valuable digital media when multiple hard drives are included, for example. Further examples of storage 512 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

The station 505 may include a controller 514 to control and manage various aspects of transceiver 506 including establishing communication links between computing stations in a NAN cluster environment and performing FTM procedures. In various embodiments, controller 514 may be implemented in software only, hardware only, or combination thereof.

In some embodiments, the controller 514 can communicate configuration information during a NAN discovery window to establish a FTM procedure with one or more stations. The configuration information can include a channel, a FTM start time, and an ordered list of one or more stations. In some embodiments, the controller 514 may communicate the configuration information on a first channel associated with the NAN cluster and perform a FTM procedure on a different channel associated with FTM procedure. However, various embodiments are not limited in this manner. Further, the controller 514 may communicate the configuration information in one or more frames, such as an SDF frame or an msFTM request/trigger frame. Various embodiments are not limited in this manner.

In some embodiments, the controller 514 may perform an FTM procedure. The FTM procedure may be an exchange of information between the station 505 and another station to determine a location or proximate location for one or both of the stations. In some embodiments, the FTM procedure may include one or more initial exchanges during a first burst period to confirm that the stations are available to proceed with the FTM procedure. For example, one or more FTMR frames and FTMR acknowledgement frames may be communicated between the station 505 and another station at a time and on a channel established in the configuration information. In some embodiments, the first FTMR frame may include a transmit/receive reservation time to establish burst protection and a first burst period to conduct the FTMR exchanges.

The controller 514 may conduct an FTMR exchange with each of the stations previously established in during a NAN discovery window. For example, the controller 514 may send an FTMR frame and, in response, receive an FTMR frame acknowledgement from each of the stations. The controller 514 may perform the FTMR exchanges in an order based on the ordered list in the configuration information.

In some embodiments, when the controller 514 is operating in a station 505 acting as a responder station, the controller 514 may initiate an FTMR exchange by sending a RTS frame including a transmit/receive reservation time for burst protection to establish a first burst period. In response, the controller 514 may receive a CTS frame. Further and in these embodiments, the controller 514 may receive one or more FTMR frames and send one or more FTMR acknowledgments with the one or more stations. In addition, at least one of the FTMR frames received from another station may also include a transmit/receive reservation time to establish, confirm and/or change a first burst period.

Once the FTMR exchanges take place between the station 505 and the other stations, the first burst period is permitted to expire and other stations may communicate on the channel. As part of the FTM procedure, the controller 514 may communicate information, such as time information, during a second burst period such that a location may be determined for the station 505 or one or other stations.

More specifically, the controller may send an FTM frame including a transmit/receive reservation time to establish a second burst period to perform one or more FTM exchanges. During an FTM exchange, the controller 514 may send and receive one or more FTM frames, and send and receive one or more FTM acknowledgement frames. When the station 505 is determining a location, the controller 514 may receive time information, as previously discussed, from one or more stations. The controller may use this time information along with its own time information to determine an RTT, as discussed above with respect to equation 1 and FIG. 3A, for example.

In some embodiments, the controller 514 may communicate time information to one or more stations such that the other stations may be able to determine a location. In this example, the controller 514 may initiate the second burst period by sending an RTS frame including a transmit/receive reservation time and receiving a CTS in response to the RTS, as previously discussed above with respect to FIG. 3B, for example.

The controller 514 may conduct any number of FTM exchanges with any number of stations. Once all the FTM exchanges complete, the second burst period may expire and other stations may communicate on the channel.

FIG. 6 illustrates an embodiment of a logic flow diagram 600. The logic flow 600 may be representative of some or all of the operations executed by one or more embodiments described herein. For example, the logic flow 600 may illustrate operations performed by stations 105 and 505, as discussed in FIGS. 1-5.

In the illustrated embodiment shown in FIG. 6, the logic flow 600 may include communicating configuration information during a neighbor aware network (NAN) discovery window to establish a fine timing measurement (FTM) procedure with one or more stations, the configuration information comprising at least one of a channel, a FTM start time, and an ordered list of the one or more stations at block 605.

In addition, the logic flow 600 may also include performing the FTM procedure with the one or more other stations by communicating information in one or more FTM frames during a burst period at block 610.

Figure 7:
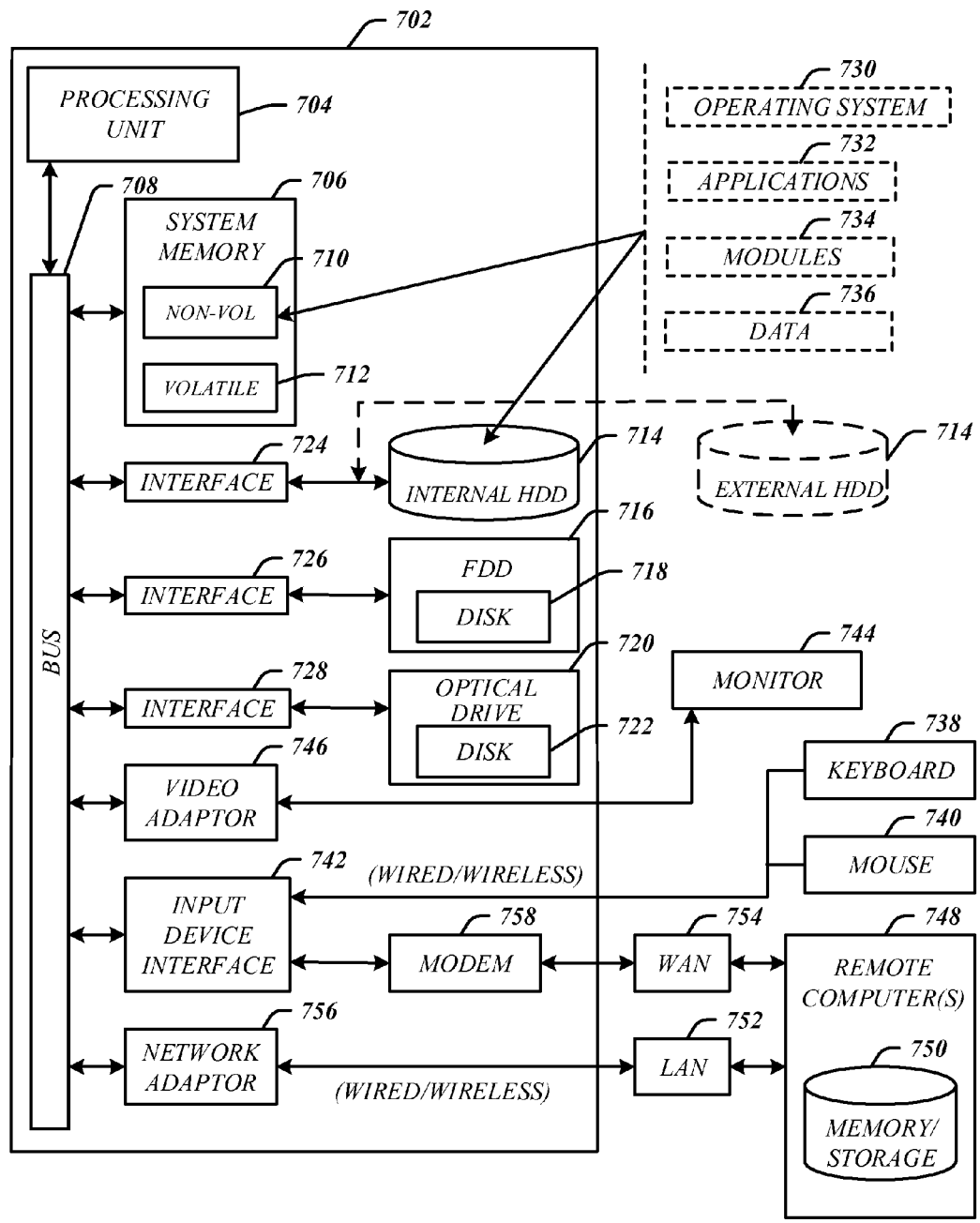
FIG. 7 illustrates an exemplary embodiment of a computing architecture.

FIG. 7 illustrates an embodiment of an exemplary computing architecture 700 suitable for implementing various embodiments as previously described. In one embodiment, the computing architecture 700 may include or be implemented as part of stations 105 and 505.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 8, the computing architecture 700 includes a processing unit 704, a system memory 706 and a system bus 708. The processing unit 704 can be any of various commercially available processors.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the computing devices 102 and 104.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 702 family of standards, such as wireless devices operatively disposed in wireless communication (e.g., IEEE 702.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 702.11x (a, b, g, n, etc.) to provide secure, reliable, fast wireless connectivity. A Wi-Fi network can be used to connect computers to each other, to the Internet, and to wire networks (which use IEEE 702.3-related media and functions).

The various elements of the systems 100, 200, 1100 and 700 as previously described with reference to FIGS. 1-6 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through twenty-five (1-25) provided below are intended to be exemplary and non-limiting.

In a first example, a system, device, controller, or an apparatus having a transceiver, and processing circuitry to communicate configuration information during a neighbor aware network (NAN) discovery window to establish a fine timing measurement (FTM) procedure with one or more stations, the configuration information comprising at least one of a channel, a FTM start time, and an ordered list of the one or more stations, and perform the FTM procedure with the one or more other stations by communicating information in one or more FTM frames during a burst period.

In a second example and in furtherance of the first example, a system, device, controller, or an apparatus may include the processing circuitry to communicate the configuration information in a multi-station fine timing measurement (msFTM) request frame or a service discovery frame.

In a third example and in furtherance of any of the previous examples, a system, device, controller, or an apparatus may include the processing circuitry to perform the FTM procedure on a channel different than a channel used to communicate the configuration information.

In a fourth example and in furtherance of any of the previous examples, a system, device, controller, or an apparatus may include the FTM procedure to determine a location of the apparatus, and the processing circuitry, to perform the FTM procedure, to communicate, via the transceiver, a first one of the one or more FTM frames comprising a transmit/receive reservation to establish the burst period, and communicate, via the transceiver, one or more FTM frames, each FTM frame comprising at least one time value to determine the location.

In a fifth example and in furtherance of any of the previous examples, a system, device, controller, or an apparatus may include the processing circuitry to communicate the one or more FTM frames during the burst period.

In a sixth example and in furtherance of any of the previous examples, a system, device, controller, or an apparatus may include the FTM procedure to determine a location of at least one of the one or more stations; and the processing circuitry, to perform the FTM procedure, to communicate, via the transceiver, a request-to-send (RTS) frame comprising a transmit/receive reservation to establish the burst period, and communicate, via the transceiver, the one or more FTM frames, each comprising at least one time value to determine the location.

In a seventh example and in furtherance of any of the previous examples, a system, device, controller, or an apparatus may include the processing circuitry to communicate the RTS frame and the one or more FTM frames during the burst period.

In an eighth example and in furtherance of any of the previous examples, a system, device, controller, or an apparatus may include the processing circuitry to perform the FTM procedure with a plurality of stations in an order based on the ordered list communicated in the configuration information.

In a ninth example and in furtherance of any of the previous examples, a system, device, controller, or an apparatus may include one or more processing units, memory, input/output interface, an antenna coupled with the transceiver, and wherein the processing circuitry is at least partially implemented in a controller.

In a tenth example and in furtherance of any of the previous examples, an article comprising a non-transitory computer-readable storage medium comprising a plurality of instructions that when executed enable processing circuitry to communicate configuration information during a neighbor aware network (NAN) discovery window to establish a fine timing measurement (FTM) procedure with one or more stations, the configuration information comprising at least one of a channel, a FTM start time, and an ordered list of the one or more stations, and perform the FTM procedure with the one or more other stations by communicating information in one or more FTM frames during a burst period.

In an eleventh example and in furtherance of any of the previous examples, an article comprising a plurality of instructions that when executed enable processing circuitry to communicate the configuration information in a multi-station fine timing measurement (msFTM) request frame or a service discovery frame.

In a twelfth example and in furtherance of any of the previous examples, an article comprising a plurality of instructions that when executed enable processing circuitry to perform the FTM procedure on a channel different than a channel used to communicate the configuration information.

In a thirteenth example and in furtherance of any of the previous examples, an article comprising a plurality of instructions that when executed enable processing circuitry to the FTM procedure to determine a location of a station, and the plurality of instructions that when executed enable processing circuitry to communicate a first one of the one or more FTM frames comprising a transmit/receive reservation to establish the burst period, and communicate one or more FTM frames, each FTM frame comprising at least one time value to determine the location.

In a fourteenth example and in furtherance of any of the previous examples, an article comprising a plurality of instructions that when executed enable processing circuitry to communicate the one or more FTM frames, and the one or more FTM acknowledgement frames during the burst period.

In a fifteenth example and in furtherance of any of the previous examples, an article comprising a plurality of instructions that when executed enable processing circuitry to the FTM procedure to determine a location of a station; and the plurality of instructions that when executed enable processing circuitry to communicate a request-to-send (RTS) frame comprising a transmit/receive reservation to establish the burst period, and communicate the one or more FTM frames, each comprising at least one time value to determine the location.

In a sixteenth example and in furtherance of any of the previous examples, an article comprising a plurality of instructions that when executed enable processing circuitry to communicate the RTS frame and the one or more FTM frames, and the one or more FTM acknowledgement frames during the burst period.

In a seventeenth example and in furtherance of any of the previous examples, an article comprising a plurality of instructions that when executed enable processing circuitry to perform the FTM procedure with a plurality of stations in an order based on the ordered list communicated in the configuration information.

In an eighteenth example and in furtherance of any of the previous examples, a method may include communicating, via a transceiver, configuration information during a neighbor aware network (NAN) discovery window to establish a fine timing measurement (FTM) procedure with one or more stations, the configuration information comprising at least one of a channel, a FTM start time, and an ordered list of the one or more stations, and performing, by a controller, the FTM procedure with the one or more other stations by communicating information in one or more FTM frames during a burst period.

In a nineteenth example and in furtherance of any of the previous examples, a method may include communicating, via the transceiver, the configuration information in a multi-station fine timing measurement (msFTM) request frame or a service discovery frame.

In a twentieth example and in furtherance of any of the previous examples, a method may include performing, by the processing circuitry, the FTM procedure on a channel different than a channel used to communicate the configuration information.

In a twenty-first example and in furtherance of any of the previous examples, a method may include the FTM procedure comprising determining a location of a station; and the method comprising communicating, via the transceiver, a first one of the one or more FTM frames comprising a transmit/receive reservation to establish the burst period, and communicating, via the transceiver, one or more FTM frames, each FTM frame comprising at least one time value to determine the location In a twenty-second example and in furtherance of any of the previous examples, a method may include communicating, via the transceiver, the one or more FTM frames, and the one or more FTM acknowledgement frames during the burst period.

In a twenty-third example and in furtherance of any of the previous examples, a method may include the FTM procedure comprising determining a location of a station; and the method comprising communicating, via the transceiver, a request-to-send (RTS) frame comprising a transmit/receive reservation to establish the burst period, and communicating, via the transceiver, one or more FTM frames, each comprising at least one time value to determine the location.

In a twenty-fourth example and in furtherance of any of the previous examples, a method may include communicating, via the transceiver, the RTS frame and the one or more FTM frames, and the one or more FTM acknowledgement frames during the burst period.

In a twenty-fifth example and in furtherance of any of the previous examples, a method may include performing, by the processing circuitry, the FTM procedure with a plurality of stations in an order based on the ordered list communicated in the configuration information.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
a transceiver; and
processing circuitry to:
communicate, via the transceiver on a neighbor aware network (NAN) channel, configuration information during a NAN discovery window to establish a fine timing measurement (FTM) procedure with one or more stations, the configuration information comprising an identification of a non-NAN channel to perform the FTM procedure, a FTM start time, and an ordered list of the one or more stations, and
perform the FTM procedure with the one or more stations by communicating information in one or more FTM frames during a burst period on the non-NAN channel to be identified in the configuration information.

2. The apparatus of claim 1, the processing circuitry to communicate the configuration information in a multi-station fine timing measurement (msFTM) request frame or a service discovery frame.

3. The apparatus of claim 1, the processing circuitry, to perform the FTM procedure to determine a location of the apparatus, to:
communicate, via the transceiver, a first one of the one or more FTM frames comprising a transmit/receive reservation to establish the burst period; and
communicate, via the transceiver, one or more FTM frames, each FTM frame comprising at least one time value to determine the location.

4. The apparatus of claim 3, the processing circuitry to communicate the one or more FTM frames during the burst period.

5. The apparatus of claim 1, the processing circuitry, to perform the FTM procedure to determine a location of at least one of the one or more stations, to:
communicate, via the transceiver, a request-to-send (RTS) frame comprising a transmit/receive reservation to establish the burst period; and
communicate, via the transceiver, the one or more FTM frames, each comprising at least one time value to determine the location.

6. The apparatus of claim 5, the processing circuitry to communicate the RTS frame and the one or more FTM frames during the burst period.

7. The apparatus of claim 1, the processing circuitry to perform the FTM procedure with each of the one or more stations in an order based on the ordered list communicated in the configuration information.

8. The apparatus of claim 1, comprising:
one or more processing units;
memory;
input/output interface; and
an antenna coupled with the transceiver, and wherein the processing circuitry is at least partially implemented in a controller.

9. An article comprising a non-transitory computer-readable storage medium comprising a plurality of instructions that when executed enable processing circuitry to:
communicate, on a neighbor aware network (NAN) channel, configuration information during a NAN discovery window to establish a fine timing measurement (FTM) procedure with one or more stations, the configuration information comprising an identification of a non-NAN channel to perform the FTM procedure, a FTM start time, and an ordered list of the one or more stations; and
perform the FTM procedure with the one or more stations by communicating information in one or more FTM frames during a burst period on the non-NAN channel identified by the configuration information.

10. The non-transitory computer-readable storage medium of claim 9, further comprising the plurality of instructions that when executed enable processing circuitry to communicate the configuration information in a multi-station fine timing measurement (msFTM) request frame or a service discovery frame.

11. The non-transitory computer-readable storage medium of claim 9, the plurality of instructions that when executed enable processing circuitry to perform the FTM procedure to determine a location of a station to:
communicate a first one of the one or more FTM frames comprising a transmit/receive reservation to establish the burst period; and
communicate one or more FTM frames, each FTM frame comprising at least one time value to determine the location.

12. The non-transitory computer-readable storage medium of claim 11, further comprising the plurality of instructions that when executed enable processing circuitry to communicate the one or more FTM frames, and the one or more FTM acknowledgement frames during the burst period.

13. The non-transitory computer-readable storage medium of claim 9, the plurality of instructions that when executed enable processing circuitry to perform the FTM procedure to determine a location of at least one of the one or more stations to:
communicate a request-to-send (RTS) frame comprising a transmit/receive reservation to establish the burst period; and
communicate the one or more FTM frames, each comprising at least one time value to determine the location.

14. The non-transitory computer-readable storage medium of claim 13, further comprising the plurality of instructions that when executed enable processing circuitry to communicate the RTS frame and the one or more FTM frames, and the one or more FTM acknowledgement frames during the burst period.

15. The non-transitory computer-readable storage medium of claim 9, further comprising the plurality of instructions that when executed enable processing circuitry to perform the FTM procedure with each of the one or more stations in an order based on the ordered list communicated in the configuration information.

16. A method, comprising:
communicating, via a transceiver on a neighbor aware network (NAN) channel, configuration information during a NAN discovery window to establish a fine timing measurement (FTM) procedure with one or more stations, the configuration information comprising an indication of a non-NAN channel to perform the FTM procedure, a FTM start time, and an ordered list of the one or more stations, and
performing, by processing circuitry, the FTM procedure with the one or more other stations by communicating information in one or more FTM frames during a burst period on the non-NAN channel indicated in the configuration information.

17. The method of claim 16, comprising:
communicating, via the transceiver, the configuration information in a multi-station fine timing measurement (msFTM) request frame or a service discovery frame.

18. The method of claim 16, to perform the FTM procedure comprising:
communicating, via the transceiver, a first one of the one or more FTM frames comprising a transmit/receive reservation to establish the burst period; and
communicating, via the transceiver, one or more FTM frames, each FTM frame comprising at least one time value to determine the location.

19. The method of claim 18, comprising communicating, via the transceiver, the one or more FTM frames, and the one or more FTM acknowledgement frames during the burst period.

20. The method of claim 16, to perform the FTM procedure comprising:
communicating, via the transceiver, a request-to-send (RTS) frame comprising a transmit/receive reservation to establish the burst period; and
communicating, via the transceiver, one or more FTM frames, each comprising at least one time value to determine the location.

21. The method of claim 20, comprising communicating, via the transceiver, the RTS frame and the one or more FTM frames, and the one or more FTM acknowledgement frames during the burst period.

22. The method of claim 16, comprising performing, by the processing circuitry, the FTM procedure with each of the one or more stations in an order based on the ordered list communicated in the configuration information.

* * * * *